Patented Nov. 1, 1932

1,885,242

UNITED STATES PATENT OFFICE

THOMAS HAROLD DURRANS, OF STRATFORD, LONDON, ENGLAND, ASSIGNOR TO A. BOAKE, ROBERTS AND COMPANY LIMITED, OF LONDON, ENGLAND, A BRITISH JOINT STOCK COMPANY

MANUFACTURE OF ALDOLS

No Drawing. Application filed March 14, 1931, Serial No. 522,788, and in England March 21, 1930.

The present invention is for improvements in and relating to the manufacture of aldols.

The use of alkaline condensing agents for the preparation of acetaldol from acetaldehyde is well known. Solutions of alkaline hydroxides and alkaline carbonates have been proposed for this purpose. The reaction is, however, difficult to control, tending to be either very sluggish or to take place suddenly and become violent and, unless carefully moderated, to give rise to undesirable by-products of a resinous nature. The tendency to a violent reaction has suggested the employment of low temperatures; and to evade the necessity of so working, the proposal has been made to employ sodium bicarbonate in excess in the solid phase and, in order to prevent the formation of the more active normal carbonate, to pass through the reaction-mixture a stream of carbon dioxide. Another difficulty associated with such condensation is that if acetic acid be present, as may readily occur by the absorption of atmospheric oxygen, this acid must be neutralized before the condensation can proceed, a further cause for uncertainty in the operative procedure thus arising. The proposal has been made carefully to neutralize the free acid before proceeding with the condensation reaction, but this neutralization is difficult to effect exactly and does not meet the case of the subsequent formation of fresh acid. It has also been proposed to adjust the hydroxyl-ion concentration within prescribed narrow limits and to effect the condensation in an inert oxygen-free atmosphere, but these operations demand technical control of a high order and are difficult to carry out efficiently in practice.

According to the present invention, a process of aldol condensation by the aid of an alkaline condensing agent is characterized in this that the condensation is effectuated by contact of the aldehyde with normal sodium carbonate, for example, in the form of soda-ash, in excess in the solid phase throughout the reaction in the continuous presence in the reaction-sphere of free water controlled in quantity to maintain the requisite degree of alkalinity of the mixture for the promotion of the condensation in a smooth reaction.

Instead, therefore, of attempting to control the alkalinity or, otherwise expressed, the $P_H$ value, by limiting the quantity of alkali itself in the reaction-sphere, the alkalinity—the $P_H$ value—and the reaction are controlled according to the present invention by regulating the water admitted to the system and by the presence of the condensing agent in excess in solid phase. The essence of the present invention is therefore the provision of a large reserve of potential catalyst (undissolved sodium carbonate), which automatically replenishes the actual catalyst (a solution of the carbonate in a homogeneous mixture of aldehyde, aldol and water) as this may suffer destruction by side-reactions (e. g. neutralization by acetic acid formed by aerial oxidation), coupled with the limitation of hydroxyl ions by limitation of the amount of water present.

While the presence of the condensing agent in excess in the solid state is considered to fulfill more than one function, namely, the neutralization of any free acid and the provision of a sufficiency of catalytic reagent to bring about the condensation, excess may be conveniently defined as meaning a quantity of solid agent more than sufficient to neutralize all acid either pre-existing or subsequently formed.

The presence of water is essential for the condensation; and the amount of water admitted to the reaction sphere should be in such excess of the quantity requisite to promote condensation as to augment the speed of reaction to a practicable degree, preferably to the maximum speed consistent with a controllable reaction.

The water may be supplied by using aldehyde containing water, or substantially anhydrous aldehyde may be used and the water provided by use of sodium carbonate carrying extraneous water in requisite amount for the reaction.

Thus, aqueous aldehyde may be caused to pass continuously through a mass of the substantially anhydrous solid catalyst, or substantially anhydrous aldehyde may be brought into contact with a mass of the solid catalyst impregnated to a greater or lesser degree with water. Such water may be supplied by the aldol-containing liquid from a previous operation.

It has been found that the condensation of acetaldehyde to acetaldol may be satisfactorily effectuated by bringing the said aldehyde into contact with a large proportion of solid substantially anhydrous sodium carbonate, for example, commercial soda-ash, in presence of free water in relatively limited amount, that is to say, in amount insufficient to over-accelerate the reaction. This amount may vary within comparatively wide limits according to the conditions, for example, the manner of working. Quantities of water up to about 25% by weight of the soda-ash have been found to give favourable results. For working in a continuous process, quite a small proportion of water has been found efficient and satisfactory; for instance, acetaldehyde containing about 5 per cent. of water may be used. By limiting the amount of water, the amount of sodium carbonate which is brought into action is limited and hence the rate of reaction is also limited. The use of a large proportion of solid condensing agent ensures an adequate supply of condensing agent to the liquid phase dispersed throughout the solid, and also effectively protects the liquid phase from the action of any acid which may be present or may be produced in the reaction mixture.

As already indicated, the invention may be operated as a continuous process. It has been found that the process proceeds smoothly, with reasonable speed, and with a satisfactory degree of conversion when the quantity of water introduced into the reaction-sphere, for example, with the aldehyde, is substantially of the same order as the quantity of water carried off from said sphere along with the reaction products. The quantity of catalyst initially taken may be about the order of the weight of acetaldol to be produced in a period of about 24 hours. It is generally preferred to work with a large excess of catalyst in the solid state, whether the process be operated continuously or "batchwise".

Example I 100 parts by weight of anhydrous commercial soda-ash were introduced into a closed vessel fitted with a stirrer and provided with suitable inlets and outlets and with a jacket for heating or cooling according to need. There were then added 130 parts by weight of anhydrous acetaldehyde and to the mixture 17 parts by weight of water were added with stirring. The temperature of the mass was kept below 15° C. by means of the cooling jacket. The mass was stirred for five hours and then 78 parts by weight of water-white aldol of 96 per cent. purity were isolated by extraction with a solvent, for example, benzene, and distillation.

Example II 100 parts by weight of commercial soda-ash were placed in a closed vessel provided as before with suitable inlets and outlets, and acetaldehyde containing about 5 per cent. of water was slowly and continuously introduced for a period of about 24 hours into the vessel so as to pass through the solid mass of carbonate therein, no special cooling being applied to the vessel. A portion of the aldehyde was condensed to aldol and the liquid issuing from the vessel was led to a continuous concentrator heated to 100° C. whereby the unchanged aldehyde was removed and returned to the vessel after adjusting the water content to substantially 5 per cent.

The aldol produced was colourless but not anhydrous. The yield in 24 hours was about 100 parts by weight.

A still for such a process may conveniently take the form of a continuous distillation column or of a continuous concentrator and may conveniently be operated at a temperature of about 100° C.

In the passage of the aldehyde through the soda-ash, water is removed with the issuing liquid and it is necessary to replace this water in order that the reaction may continue or proceed with sufficient rapidity. This replacement may be effected either by the direct addition of water or, as just indicated, by the use of aldehyde containing water, this latter procedure having the advantage that the formation of the dangerously explosive per-acetic acid in the aldehyde is mitigated or entirely prevented. The risk of the formation of this dangerous substance, and also of acetic acid which means destruction of part of the catalyst, may be further reduced by conducting the operations in an inert oxygen-free atmosphere.

The proportion of liquid admixed with the soda-ash or the like may be sufficient to render the reaction mixture fluid and easily stirrable, or said mixture may contain such higher proportion of the solid that the liquid merely percolates through or is forced through by pressure as in a filter-press.

In carrying the invention into effect in another way, wherein a fluid mass was used, acetaldehyde was distilled on to soda-ash mixed with some liquid from a previous operation until the reaction-vessel was filled to its operable capacity, the mixture being stirred, and the temperature being controlled by heating to a temperature below the boiling-point of the mixture or by cooling as the occasion demanded for maintaining the desired speed of reaction. The aldol and unchanged aldehyde were subsequently separated by distillation.

I claim:—

1. The condensation of acetaldehyde to acetaldol by contact of the aldehyde with a saturated solution of normal sodium carbonate in the continuous presence throughout the reaction of free water and of a large reserve of potential catalyst in the form of undissolved normal carbonate.

2. Effectuating the condensation of acetaldehyde to acetaldol by contacting the aqueous parent aldehyde with an excess of a mass of substantially anhydrous solid normal sodium carbonate.

3. Effectuating the condensation of acetaldehyde to acetaldol, by contacting the parent aldehyde with normal sodium carbonate, in excess, in the solid phase throughout the reaction, in the continuous presence in the reaction-sphere of free water up to substantially 25 per cent. by weight of the solid sodium carbonate.

4. Effectuating the condensation of acetaldehyde to acetaldol by contacting the parent aldehyde with soda ash in excess in the solid phase throughout the reaction in the continuous presence in the reaction-sphere of free water up to substantially 25 per cent. by weight of the total soda ash.

5. The condensation of acetaldehyde to acetaldol by continuously bringing the aqueous parent aldehyde into contact with substantially anhydrous normal sodium carbonate maintained in excess in the solid phase throughout the reaction.

6. Effectuating the condensation of acetaldehyde to acetaldol by continuously bringing the parent aldehyde containing substantially 5 per cent. of free water into contact with substantially anhydrous normal sodium carbonate maintained in excess in the solid phase throughout the reaction.

7. Effectuating the condensation of acetaldehyde to acetaldol by continuously bringing the parent aldehyde containing substantially 5 per cent. of free water into contact with an excess of substantially anhydrous normal sodium carbonate maintained in excess in the solid phase throughout the reaction, the amount of free water in the reaction-sphere introduced with the aldehyde being substantially the same as the amount of water carried away with the products of the reaction.

8. Effectuating the condensation of acetaldehyde to acetaldol by distilling the parent aldehyde on to solid normal sodium carbonate maintained in excess in the solid phase throughout the distillation and carrying free extraneous water up to substantially 25 per cent. by weight of the carbonate, the mixture being kept in agitation during the process with temperature adjustment to maintain the desired speed and control of the reaction.

THOMAS HAROLD DURRANS.